US011187935B2

United States Patent
Ohashi et al.

(10) Patent No.: US 11,187,935 B2
(45) Date of Patent: Nov. 30, 2021

(54) DISPLAY PANEL AND DISPLAY DEVICE

(71) Applicant: SHARP KABUSHIKI KAISHA, Sakai (JP)

(72) Inventors: Noriyuki Ohashi, Sakai (JP); Yasuhiro Kuroe, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/882,655

(22) Filed: May 25, 2020

(65) Prior Publication Data

US 2020/0379293 A1 Dec. 3, 2020

Related U.S. Application Data

(60) Provisional application No. 62/855,410, filed on May 31, 2019.

(51) Int. Cl.
G02F 1/1335 (2006.01)
G02F 1/1343 (2006.01)
G02F 1/1337 (2006.01)

(52) U.S. Cl.
CPC ...... G02F 1/133512 (2013.01); G02F 1/1337 (2013.01); G02F 1/134309 (2013.01)

(58) Field of Classification Search
CPC ............. G02F 1/1337; G02F 1/133512; G02F 1/13354; G02F 1/134309
See application file for complete search history.

(56) References Cited

U.S. PATENT DOCUMENTS

| 9,575,370 | B2 * | 2/2017 | Moriwaki | G02F 1/1339 |
| 2011/0134352 | A1 * | 6/2011 | Nakagawa | G02F 1/1339 349/43 |
| 2015/0022772 | A1 * | 1/2015 | Akiyoshi | G02F 1/1339 349/153 |
| 2015/0301370 | A1 | 10/2015 | Moriwaki | |

FOREIGN PATENT DOCUMENTS

WO 2014/038159 A1 3/2014

* cited by examiner

*Primary Examiner* — Dung T Nguyen
(74) *Attorney, Agent, or Firm* — ScienBiziP, P.C.

(57) ABSTRACT

A display panel includes an array substrate in which a plurality of pixel electrodes are arranged, and the counter substrate. A non-display area of the array substrate is provided with the transfer electrode for supplying a potential to the counter substrate. The counter substrate includes: a first film; a counter electrode placed closer to the array substrate in relation to the first film, and supplied with the potential from the transfer electrode; and an alignment film stacked on the counter electrode. The counter substrate includes first grooves provided between a display area and a transfer overlapping area overlapping with the transfer electrode, the first grooves penetrating the counter electrode and at least a portion of the first film. The first grooves extend in a first longitudinal direction, and are formed in broken line in the first longitudinal direction.

14 Claims, 9 Drawing Sheets

DISPLAY PANEL AND DISPLAY DEVICE

CROSS-REFERENCE TO RELATED APPLICATION

The present application claims priority to U.S. Provisional Application Ser. No. 62/855,410, filed May 31, 2019, the content to which is hereby incorporated by reference into this application.

BACKGROUND OF THE INVENTION

The present disclosure relates to a display panel and a display device.

DESCRIPTION OF THE RELATED ART

A liquid crystal panel as a main component of a liquid crystal display device conventionally includes a pair of substrates and a liquid crystal layer sealed therebetween. Formed on an inner surface of the pair of substrates is an alignment film made of an insulating material such as polyimide resin to align liquid crystal molecules included in the liquid crystal layer. The alignment film is formed by application of an alignment film material. The alignment film material could cause a problem if the material applied is wet and spreads to an outer periphery of a substrate for the liquid crystal panel. For example, the outer periphery is provided with an electrode (e.g., a transfer electrode) for electrically connecting both of the substrates together. If the alignment film material adheres to a place in which this electrode is provided, the adhering alignment film material would cause faulty connection between the substrates. Hence, providing a regulator is known to regulate the spread of the alignment film material. An example of such a regulator is disclosed in International Publication WO 2014/038159. The regulator cited in International Publication WO 2014/038159 includes a groove formed on a film below an alignment film. This groove retains an alignment film material to keep the alignment film material from wet-spreading.

SUMMARY OF THE INVENTION

Unfortunately, the groove cited in International Publication WO 2014/038159 could cause instability in electrical resistance between a common transfer electrode (a transfer electrode) and a common electrode (a counter electrode) electrically connecting both of the substrates together. The counter electrode is stacked on the groove by vapor deposition. Hence, when the groove has a side wall with greatly angled (e.g., a side wall orthogonal to a face of the substrates), the counter electrode cannot be properly stacked on the side wall. As a result, depending on how the counter electrode is stacked on the side wall, the counter electrode would inevitably break or partially break to increase in resistance, causing a problem of instability in electrical resistance between the substrates.

SUMMARY OF INVENTION

One aspect of the present disclosure is accomplished based on the above circumstances, and intended to stabilize electrical resistance between substrates while regulating spread of an alignment film material.

Solution to Problem (1) An embodiment of the present disclosure is directed to a display panel including a display area and a non-display area surrounding the display area. The display panel includes: an array substrate in which a plurality of pixel electrodes are arranged; and a counter substrate facing the array substrate, wherein the non-display area of the array substrate is provided with a transfer electrode for supplying a predetermined potential to the counter substrate, the counter substrate includes: a first film; a counter electrode placed closer to the array substrate in relation to the first film, and supplied with the potential from the transfer electrode; and an alignment film stacked on the counter electrode, the counter substrate includes first grooves provided between the display area and a transfer overlapping area overlapping with the transfer electrode, the first grooves penetrating the counter electrode and at least a portion of the first film, and the first grooves extend in a first longitudinal direction in plan view, the first grooves being formed in broken line and arranged to have predetermined clearances in the first longitudinal direction.

(2) Moreover, an embodiment of the present disclosure including the configuration in item (1) is directed to the display panel, wherein the first film includes a light shielding film, and the first groove penetrates the light shielding film.

(3) Furthermore, an embodiment of the present disclosure including the configuration in item (1) or (2) is directed to the display panel, wherein the first film includes: the light shielding film; and an overcoat film having an insulating property and stacked on the light shielding film, and the first groove penetrates at least the overcoat film.

(4) Moreover, an embodiment of the present disclosure including any one of the configurations in items (1) to (3) is directed to the display panel, wherein the first longitudinal direction intersects in plan view with a direction in which a center of the display area and a center of the transfer electrode are connected.

(5) Furthermore, an embodiment of the present disclosure including any one of the configurations in items (1) to (4) is directed to the display panel, wherein the first grooves are aligned in columns provided in parallel with one another.

(6) Moreover, an embodiment of the present disclosure including the configuration in item (5) is directed to the display panel, wherein the first grooves are provided so that the predetermined clearances of the first grooves adjacent to one another between the columns are not arranged side by side.

(7) Furthermore, an embodiment of the present disclosure including the configuration in item (5) or (6) is directed to the display panel, wherein the first grooves adjacent to one another between the columns are arranged to shift by half a pitch from each other.

(8) Moreover, an embodiment of the present disclosure including any one of the configurations in items (1) to (7) is directed to the display panel, wherein the counter electrode and at least the portion of the first film include a second groove provided in an area in which the first groove is not provided, and surrounding the display area.

(9) Furthermore, an embodiment of the present disclosure including any one of the configurations in items (1) to (8) is directed to the display panel, wherein the counter electrode and at least the portion of the first film include third grooves provided between the transfer overlapping area and an outer periphery of the counter substrate, and the third grooves extend in a third longitudinal direction in plan view, the third grooves being formed in broken line and arranged to have the predetermined clearances in the third longitudinal direction.

(10) Moreover, an embodiment of the present disclosure including any one of the configurations in items (1) to (9) is directed to the display panel, wherein the non-display area includes a seal configured to attach the array substrate and the counter substrate together, and the transfer electrode is provided to overlap with the seal.

(11) Furthermore, an embodiment of the present disclosure including the configuration in item (10) is directed to the display panel, wherein the seal contains conductive particles.

(12) Moreover, an embodiment of the present disclosure including any one of the configurations in items (1) to (11) is directed to the display panel. The display panel further includes a liquid crystal layer sealed between the array substrate and the counter substrate.

(13) Furthermore, an embodiment of the present disclosure including any one of the configurations in items (1) to (12) is directed to the display panel, wherein the pixel electrode is provided with a pixel interconnect to connect the pixel electrode and a memory circuit.

(14) Moreover, an embodiment of the present disclosure including any one of the configurations in items (1) to (13) is directed to the display panel, wherein the pixel electrode is optically reflective, and includes an opening through the pixel electrode along a film thickness.

(15) Furthermore, an embodiment of the present disclosure is directed to a display device including: the display panel according to any one of configurations in items (1) to (14); and an illumination device configured to emit light to the display panel.

One aspect of the present disclosure can stabilize electrical resistance between substrates while regulating spread of an alignment film material.

DETAILED DESCRIPTION OF THE INVENTION

First Embodiment

Figure 1:
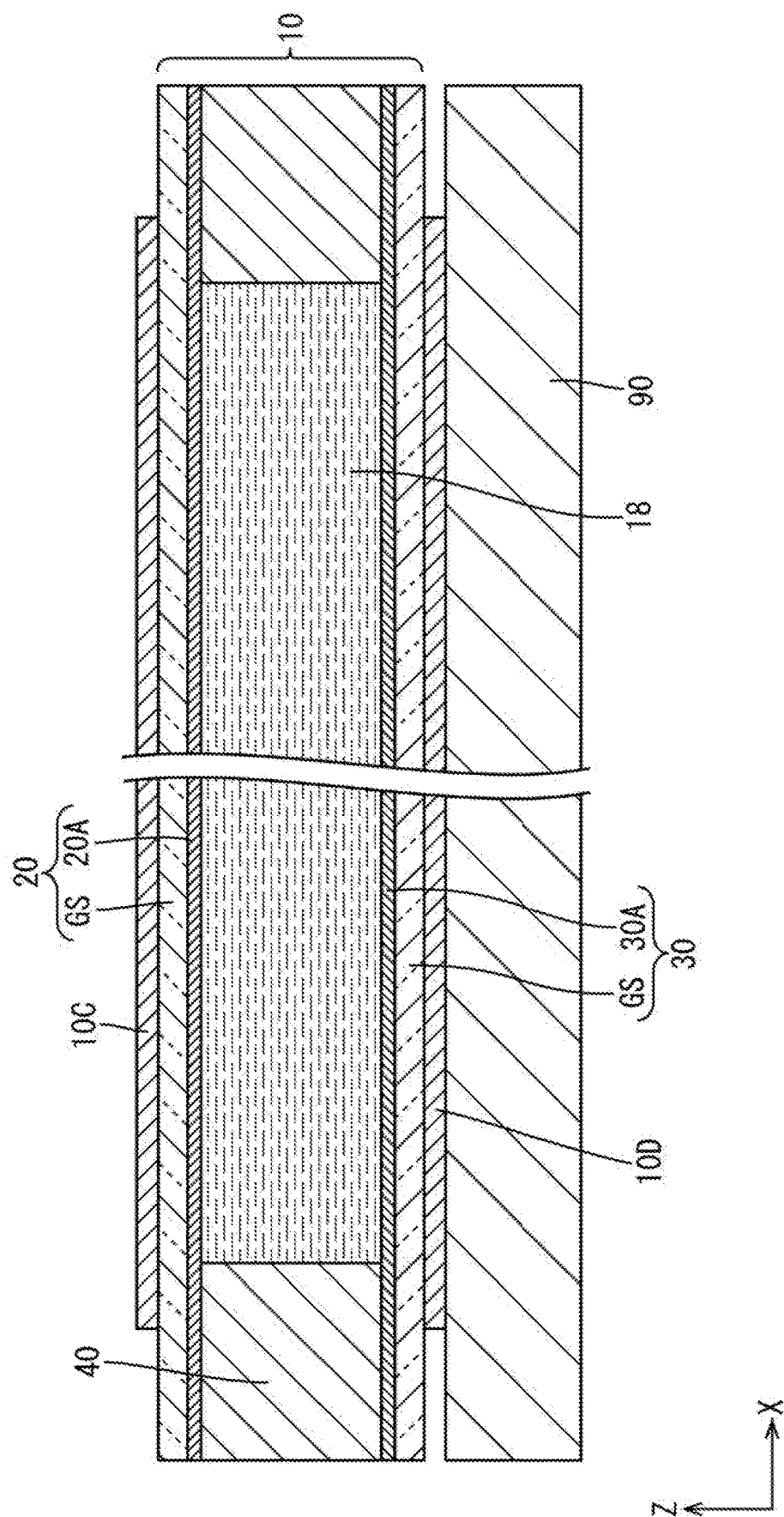
FIG. 1 is a cross-sectional view of a liquid crystal display (LCD) device according to a first embodiment.

Described is a first embodiment of the present disclosure with reference to FIGS. 1 to 7. In this embodiment, described as an example is an LCD device 100 (an example of a display device) including a liquid crystal panel 10 (an example of a display panel). Note that an X-axis, a Y-axis, and a Z-axis are illustrated in a portion of each drawing. The directions of axes are common among the drawings. Moreover, in the drawings, the upper side and the lower side are respectively the front side and the rear side of the LCD device 100.

As illustrated in FIG. 1, the LCD device 100 includes: the liquid crystal panel 10 capable of displaying an image; and a backlight device 90 (an example of an illumination device). The backlight device 90 is an external light source provided in rear of the liquid crystal panel 10 and emitting light for displaying the image on the liquid crystal panel 10.

As illustrated in FIG. 1, the liquid crystal panel 10 includes: a pair of substrates 20, 30; a liquid crystal layer 18; and a seal 40. The liquid crystal layer 18 includes liquid crystal molecules; that is, a substance held in an internal space between the substrates 20 and 30, and changing in optical property with application of electric field. The seal 40 is interposed between the substrates 20 and 30 and surrounds the liquid crystal layer 18, to seal the liquid crystal layer 18. Of the pair of substrates 20, 30, provided in the front (the front side) is a counter substrate (a CF substrate, a color filter substrate) 20, and provided in the rear (the back side) is an array substrate (a TFT substrate) 30. The counter substrate 20 includes: a glass substrate GS; and a film 20A stacked on an inner face of the grass substrate GS. The array substrate 30 includes: a glass substrate GS; and a film 30A stacked on an inner face of the grass substrate GS. Note that a polarizing plate 10C is attached to an outer face of the substrate 20, and a polarizing plate 10D is attached to an outer face of the substrate 30.

Figure 2:
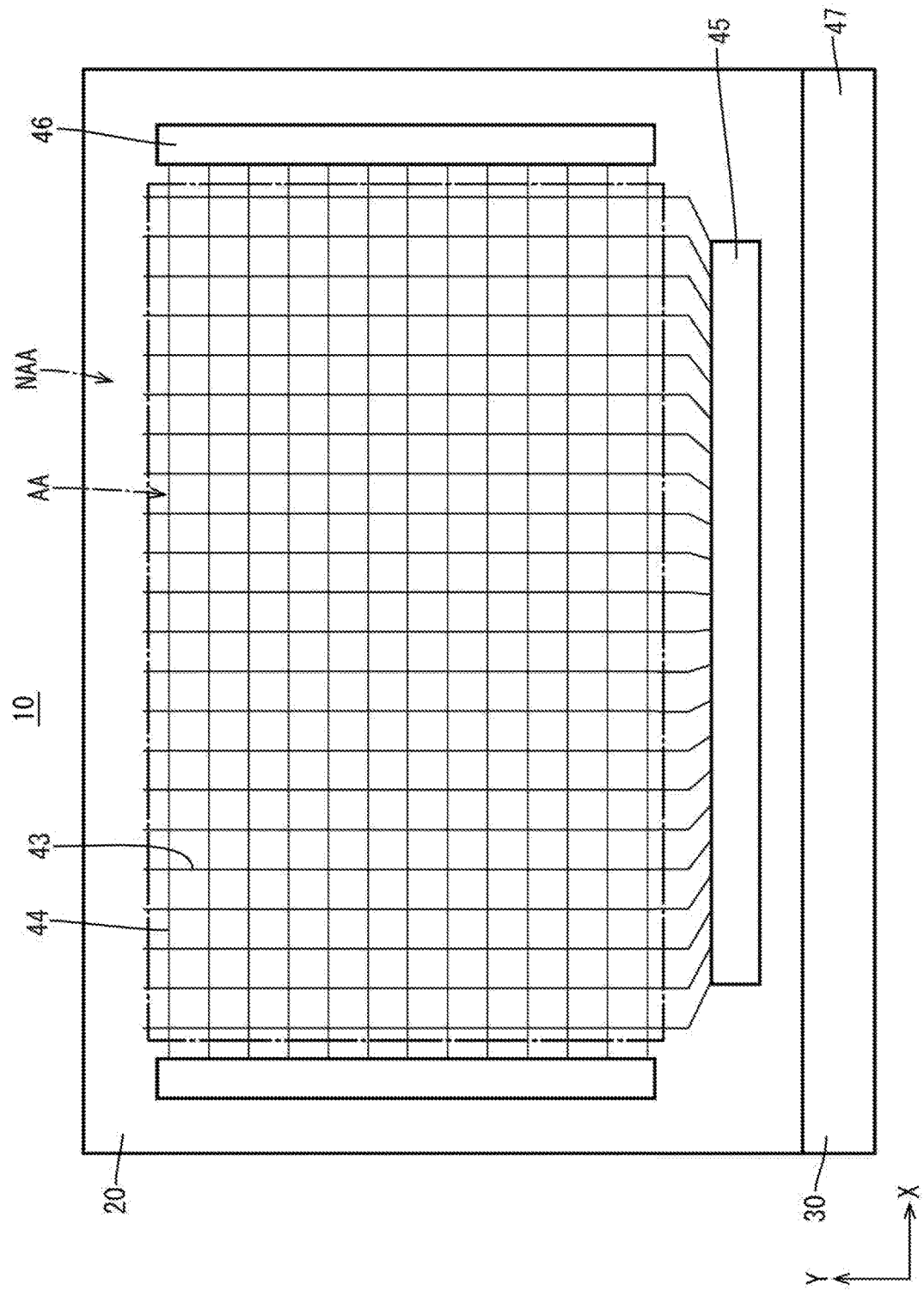
FIG. 2 is a plan view of a liquid crystal panel.

As illustrated in FIG. 2, the liquid crystal panel 10 is shaped into a rectangle. The inside of the panel face is divided into a display area (an active area) AA and a non-display area (a non-active area) NAA. The display area AA is capable of displaying an image and placed in the middle. The non-display area is placed around a periphery of the liquid crystal panel 10 to surround the display area AA, and shaped into a frame (a picture frame) in plan view. In FIG. 2, a dot-dash line represents an outline of the display area AA. An area outside the dot-dash line represents the non-display area NAA. As illustrated in FIG. 2, the array substrate 30 has: a longitudinal side substantially as long as that of the counter substrate 20; and a transverse side longer than that of the counter substrate 20. Hence, when the array substrate 30 and the counter substrate 20 are attached to the seal 40 with their longitudinal sides aligned with one side, the array substrate 30 has an exposed portion not overlapping with the counter substrate 20. This non-overlapping portion is a portion of the non-display area NAA, and provided with a terminal 47 to be connected outside. The terminal 47 receives from an external control substrate a control signal controlling drive of the liquid crystal panel 10, and various kinds of signals for, for example, a power source.

As illustrated in FIG. 2, the display area AA of the array substrate 30 is provided with many source interconnects (data interconnects, signal interconnects) 43 and gate interconnects (scan interconnects) 44 intersecting each other in the form of a grid. The gate interconnects 44 extend along the X-axis (the horizontal direction). The gate interconnects 44 are connected at opposing ends to a gate driver 46 supplying a gate signal to the gate interconnects 44. The source interconnects 43 extend along the Y-axis (the vertical direction). The source interconnects 43 are connected at one end to the binary driver 45 (an example of a source driver) supplying a binary signal to the source interconnects 43. The binary driver 45, the gate driver 46, and a transfer electrode 37 described later are connected to, and receive various kinds of signals through, the terminal 47.

Figure 3:
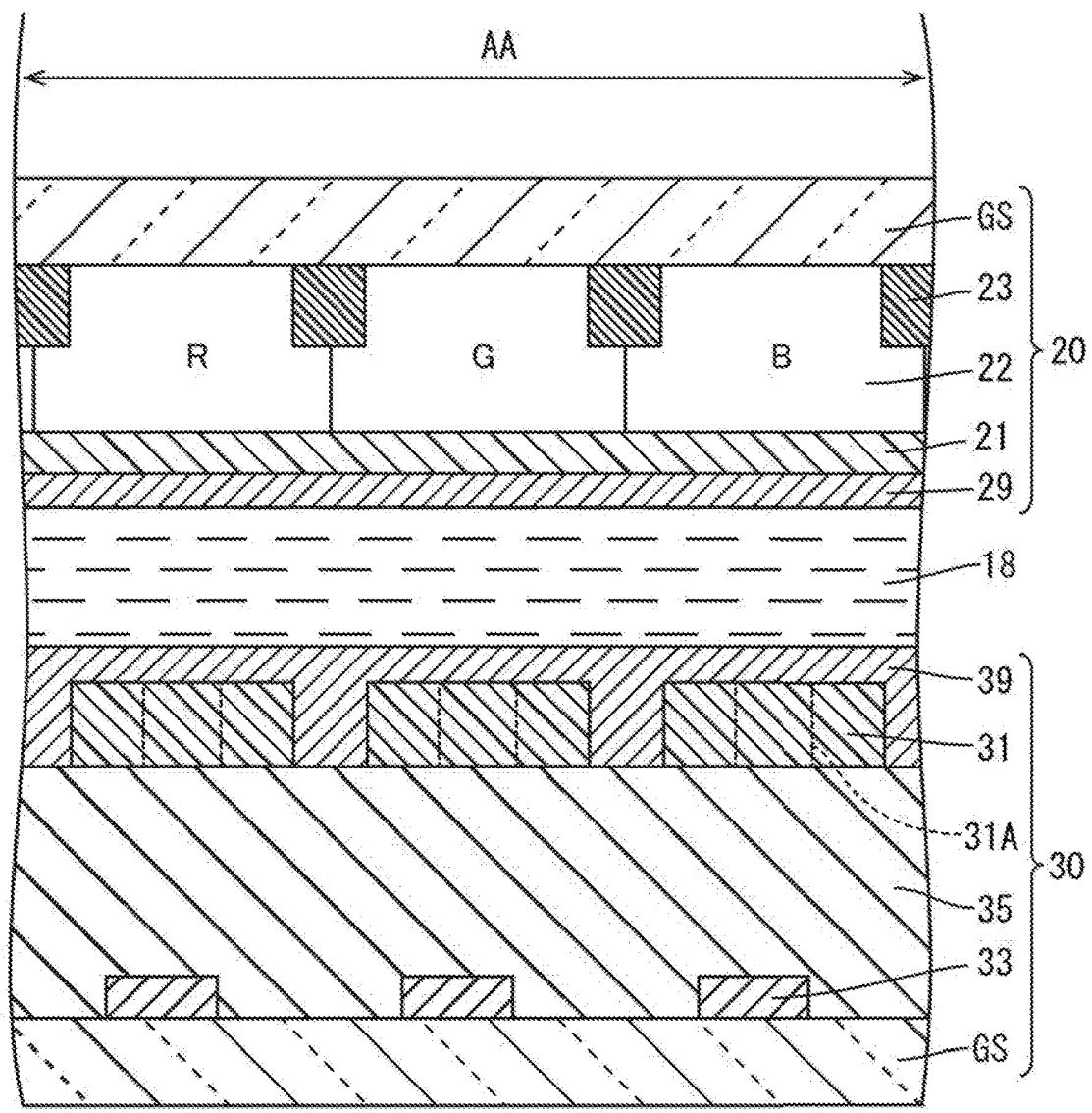
FIG. 3 is a cross-sectional view of a display pixel in the liquid crystal panel.

As illustrated in FIG. 3, an area surrounded by the source interconnects 43 and the gate interconnects 44 is provided with pixel electrodes 31. Connected to each of the pixel electrodes 31 through a pixel interconnect 33 is a memory circuit such as a switching element (e.g., a thin film transistor; namely, TFT) and a static RAM. With the source interconnects 43 and the gate interconnects 44, desired switching elements turn ON. When the memory circuits store data, the pixel electrodes 31 are charged at a predetermined potential, depending on the stored data. Then, using a potential difference between the pixel electrodes 31 and the counter electrode 21, an electric field to be applied to the liquid crystal layer 18 is controlled and orientations of the liquid crystal molecules are appropriately switched, thereby driving the liquid crystal panel 10. The liquid crystal panel 10 is so-called a memory liquid crystal panel in which a memory circuit is provided for each pixel electrode 31. Compared with a typical active-matrix liquid crystal panel, the liquid crystal panel 10 is low in power consumption. Note that the source interconnects 43, the gate interconnects 44, and the pixel interconnects 33 are made of conductive materials. Examples of the conductive materials include: a single layer of film made of such metallic materials as tungsten (W), copper (Cu), molybdenum (Mo), titanium (Ti), and Aluminum (Al), or a film including stacked layers made of different such metallic materials, or an alloy made of different such metallic materials.

As illustrated in FIG. 3, the pixel electrodes 31 are arranged above the pixel interconnects 33 through a planarized film 35; that is, the pixel electrodes 31 are arranged close to the counter substrate 20. The planarized film 35 is made of an organic insulating material such as acrylic resin, and planarizes asperities formed as such components as the pixel interconnects 33 are provided on the surface of the glass substrate GS. The planarized surface acts as a face on which the pixel electrodes 31 are formed. The pixel electrodes 31 are made of a conductive material (e.g., metals such as Al and silver (Ag)) optically reflective, and are capable of reflecting outside light (natural light) coming from the counter substrate 20 through the liquid crystal layer 18. The light reflected from the pixel electrodes 31 bounces back toward the counter electrode 20 again through the liquid crystal layer 18, and are used for reflection display. Moreover, each pixel electrode 31 includes an opening 31A through the pixel electrode 31 along a film thickness. The opening 31A is capable of transmitting light emitted from a backlight 90. The right transmitted through the opening 31A travels through the liquid crystal layer 18 toward the counter electrode 20, and is used for transmissive display. Such features allow the LCD device 100 to perform transmissive display at night, using the light from the backlight 90, as well as to perform reflection display in the day time when natural light is emitted. Hence, the LCD device 100 is semi-transmissive capable of reducing power consumption.

Figure 7:
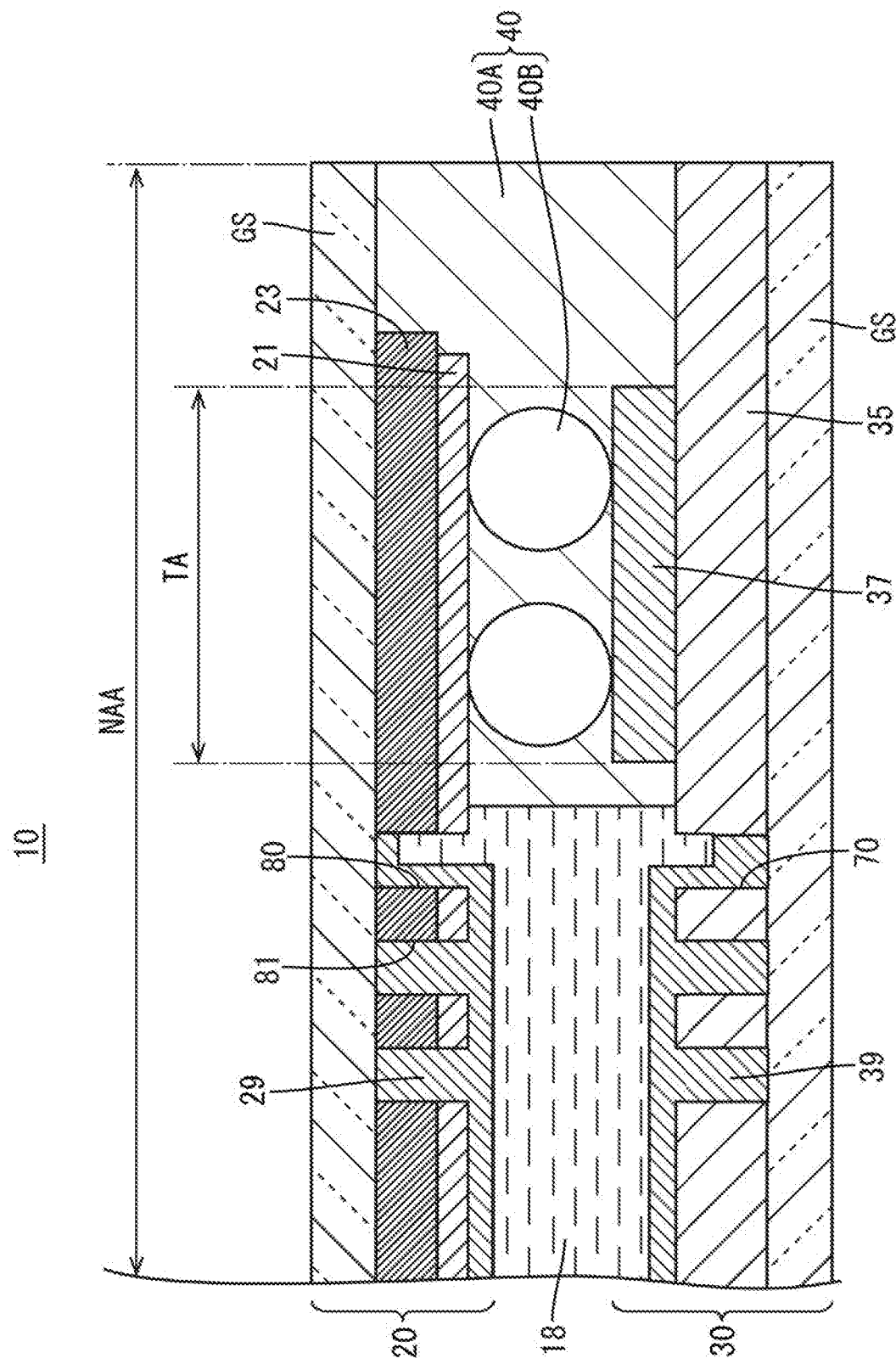
FIG. 7 is a cross-sectional view of the liquid crystal panel taken from line VII-VII of FIGS. 4 and 5.

As illustrated in FIG. 3, the counter substrate 20 is provided with a color filter 22 placed in parallel in a matrix to overlap in plan view with the pixel electrodes 31 of the array substrate 30. As illustrated in FIG. 3, the color filter 22 includes coloring portions of R (red), G (green), and B (blue). In the liquid crystal panel 10, a single display pixel; that is, a unit of display, includes a pair of: the coloring portions of R, G, and B; and the three pixel electrodes facing the coloring portions. Provided between the coloring portions is a light shielding film (a black matrix) 23 (an example of a first film) to keep the colors from mixing together. The light shield film 23 is made of such light shielding materials as Ti and black resin. Moreover, as illustrated in FIG. 7, the light shielding film 23 is also formed in an area overlapping with the non-display area NAA. The light shielding film 23 visually blocks from outside the various components arranged in the outer circumference of the LCD device 100, and keeps the light from the backlight 90 from leaking toward the outer circumference. As illustrated in FIGS. 3 and 7, on a rear surface (to the array substrate 30) of the color filter 22, the counter electrode 21 is formed across the display area AA and partially across the non-display area NAA. The counter electrode 21 is made of a transparent electrode film such as indium tin oxide (ITO).

As illustrated in FIGS. 3 and 7, alignment films 29, 39 are respectively formed on the innermost (near the liquid crystal layer 18) of the counter substrate 20 and the array substrate 30. The alignment films 29, 39 are made of an organic insulating material such as polyimide resin. The alignment films 29, 39 make contact with the liquid crystal layer 18 so that the liquid crystal molecules included in the liquid crystal layer 18 are oriented. The alignment film 29, 39 are made of an alignment film material applied with a flexographic printer or an inkjet printer to form a solid film across the display area AA and partially across the non-display area NAA of the both substrates 20, 30.

Figure 4:
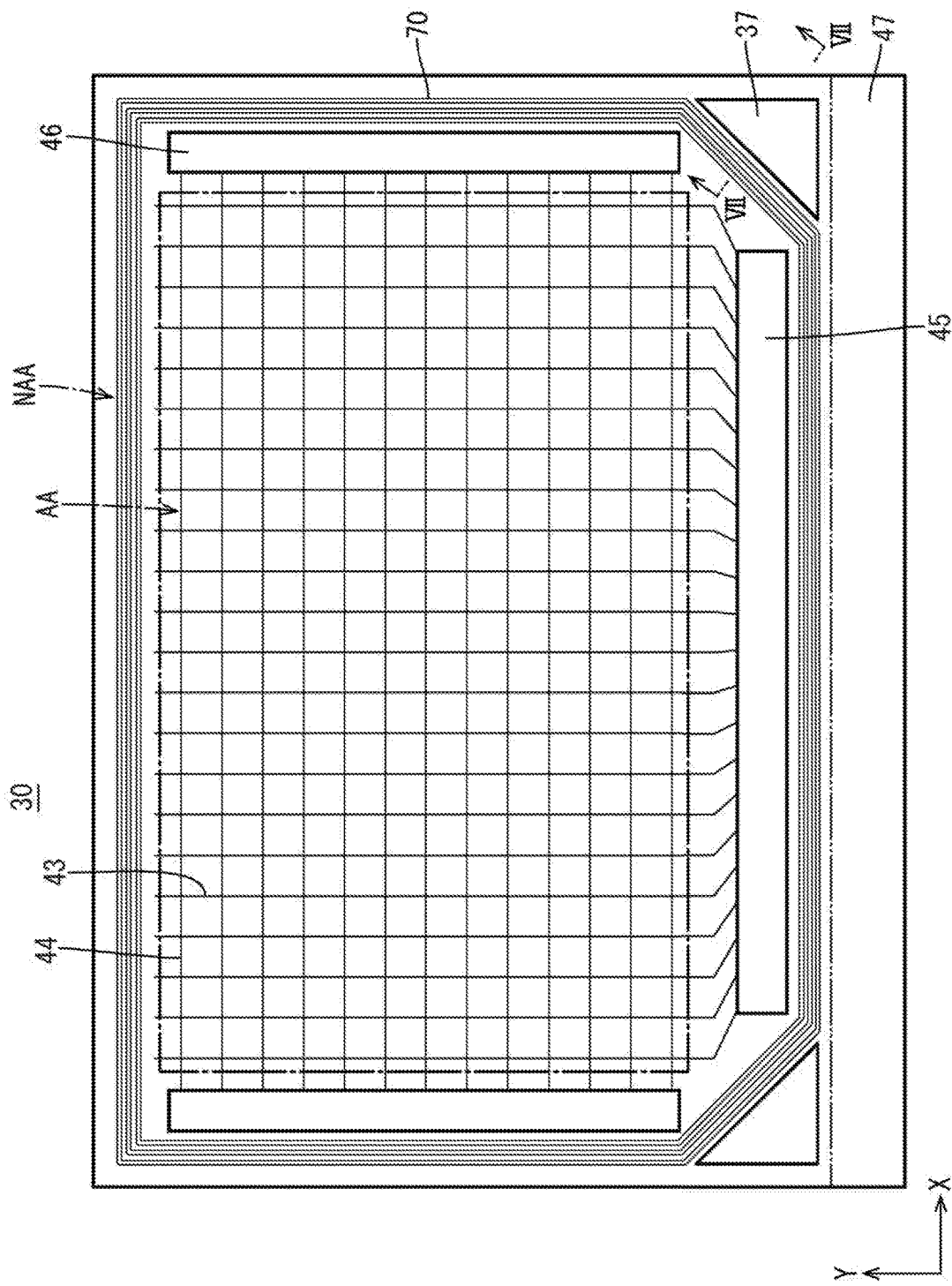
FIG. 4 is a plan view of an array substrate.

As illustrated in FIG. 4, the non-display area NAA of the array substrate 30 is provided with the transfer electrode 37 for supplying a reference potential to the counter electrode 21 of the counter substrate 20. Specifically, two transfer electrodes 37 are each provided to a corresponding one of right and left corners, of the non-display area NAA, close to the terminal 47. Each of the transfer electrodes 37 is shaped triangularly to conform to the shape of the corner. The transfer electrode 37 is made of a conductive material (e.g., metals such as Al and Ag). As illustrated in FIG. 7, the transfer electrode 37 is formed on the planarized film 35 in the array substrate 30. Furthermore, the transfer electrode 37 is provided in an area overlapping with the seal 40. Such a feature eliminates the need of separately ensuring space to place the transfer electrode 37, contributing to reduction in the size of the frame-like liquid crystal panel 10.

As illustrated in FIG. 7, the seal 40 is made of an ultraviolet-curable resin material 40A having an insulation property, and conductive particles 40B mixed with the ultraviolet-curable resin material 40A. When the ultraviolet-curable resin material 40A is irradiated with ultraviolet to cure to be solid, the array substrate 30 and the counter substrate 20 are attached together. Moreover, the transfer electrode 37 and the counter electrode 21 are electrically connected together through the conductive particles 40B, such that the reference potential is supplied from the transfer electrode 37 to the counter electrode 21. The conductive particles 40B are made of, for example, resin particles whose surface is coated with vapor-deposited conductive materials such as gold.

Figure 5:
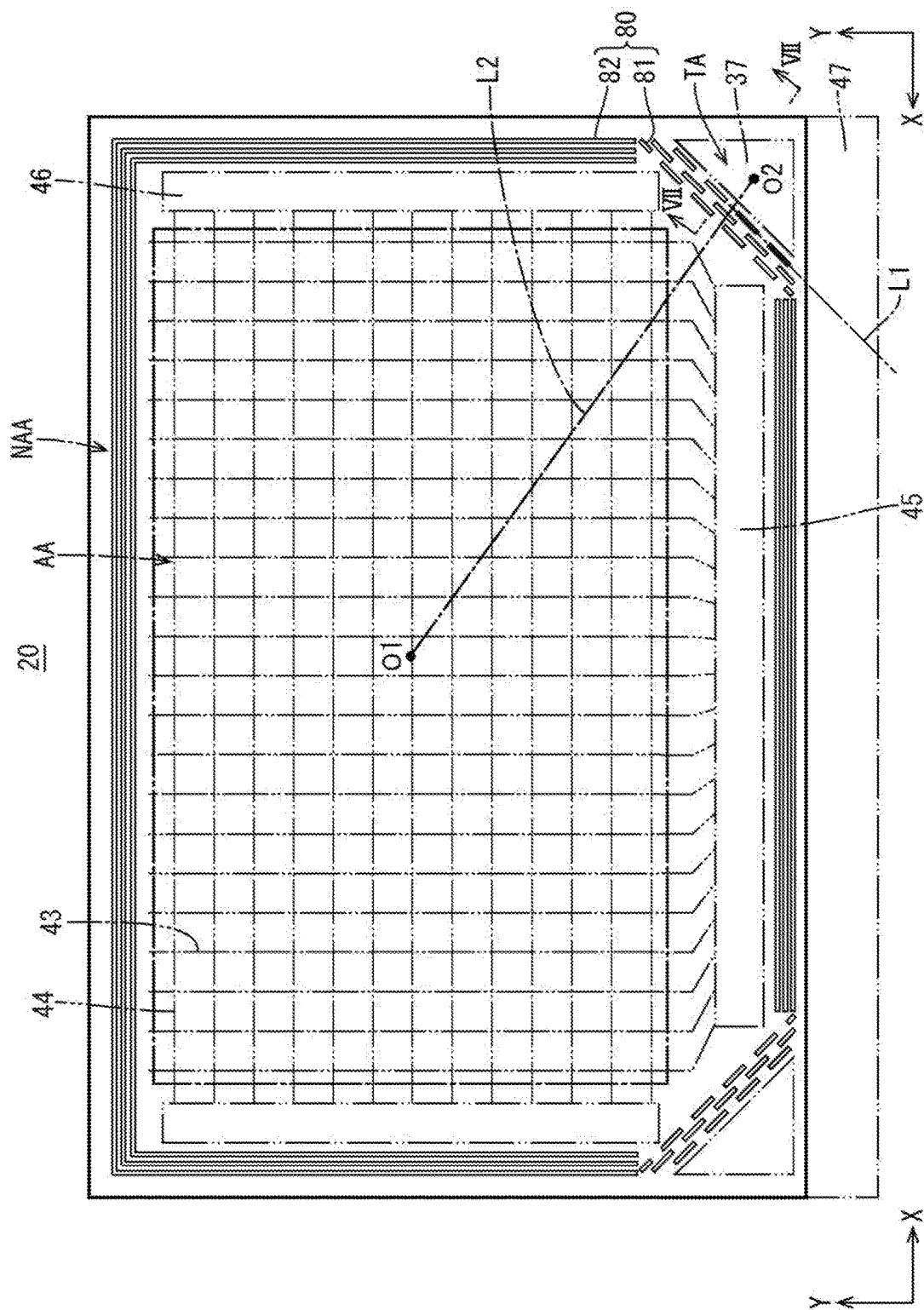
FIG. 5 is a plan view of a counter substrate.

In a manufacturing process, if the alignment film material adheres to at least one of the transfer electrode 37 or the counter electrode 21 overlapping with the transfer electrode 37, both the transfer electrode 37 and the counter electrode 21 cease conduction. As a result, the reference potential is not supplied to the counter electrode 21. Furthermore, if the alignment film material completely covers an area in which the seal 40 is to be provided, the seal 40 decreases in adhesion such that water enters the liquid crystal layer 18, deteriorating display quality. Hence, each of the array 30 and the counter substrate 20 is provided with a groove to retain an alignment film material so that the groove acts as a regulator to regulate the spread of the alignment film material. As specifically illustrated in FIG. 4, the array substrate 30 includes an array substrate grove 70 shaped into a loop to run between the transfer electrode 37 and the display area AA and surround the display area AA. Moreover, as illustrated in FIG. 5, the counter substrate 20 includes a counter substrate groove 80. The counter substrate groove 80 includes: a first groove 81 provided between the display area AA and a transfer overlapping area TA overlapping with the transfer electrode 37; and a second groove 82 provided in an area in which the first groove 81 is not provided, and surrounding the display area AA. Hence, the regulator is provided to surround the display area AA so that the alignment film material can be regulated not to completely cover in all directions the area in which the seal 40 is to be provided.

As illustrated in FIGS. 4 and 5, the array substrate groove 70 and the counter substrate groove 80 each include a plurality of grooves aligned in columns (grooves in three columns in the drawings) arranged in parallel with one another. The plurality of grooves in column can regulate the spread of the alignment film material by a groove in the outer periphery even if a groove in the inner periphery cannot regulate the spread. Such a feature makes it possible to increase the amount of the material to be retained in the grooves, enhancing the regulation. As illustrated in FIG. 7, the array substrate groove 70 is provided to penetrate the planarized film 35 to which the alignment film 39 is applied. The counter substrate groove 80 is provided to penetrate: the counter electrode 21 to which the alignment film 29 is applied; and the light shielding film 23 placed on the counter electrode 21 to face the glass substrate GS.

Figure 6:
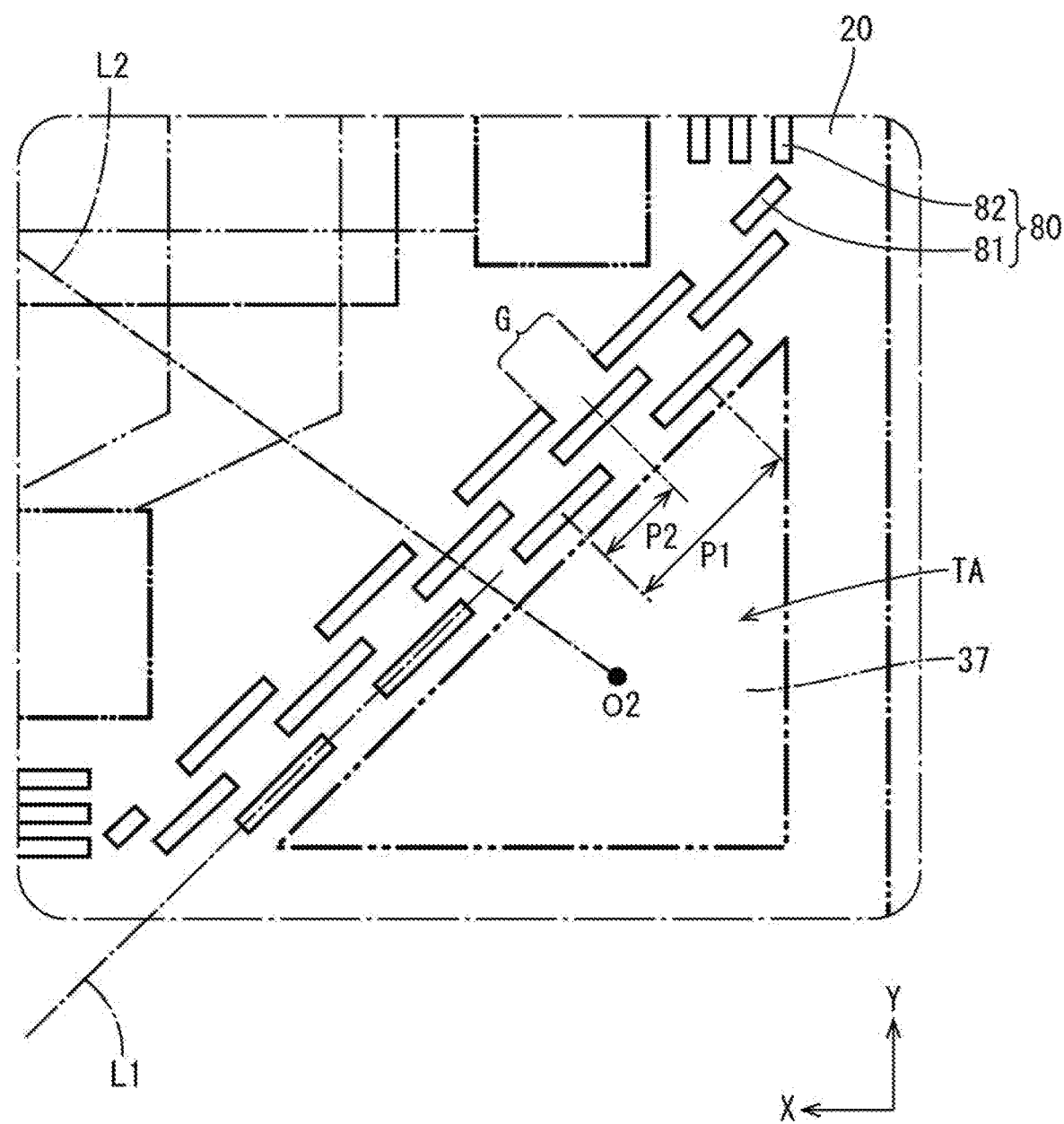
FIG. 6 is an enlarged view of a part including a first groove.

As illustrated in FIGS. 5 and 6, the first groove 81 is formed to extend along a side (a first longitudinal direction L1), of the triangular electrode 37, facing the display area AA. Such a feature allows the first groove 81 to retain wet and spreading alignment film material from the display area AA, keeping the alignment film material from reaching the transfer overlapping area TA. Moreover, as illustrated in FIG. 7, the first groove 81 penetrates the counter electrode 21 such that the counter electrode 21 is not stacked on the side wall of the first groove 81. Such a feature does not cause instability, in electrical resistance of the counter electrode 21, due to an angled side wall. Moreover, the first groove 81 includes a plurality of first grooves 81 formed in broken line and arranged to have predetermined clearances G in the first longitudinal direction L1. Hence, through the clearances G, the counter electrode 21 is in conduction to the inner face. Such a feature makes it possible to stably ensure conduction between the counter electrode 21 and the transfer electrode 37.

As illustrated in FIGS. 5 and 6, the first longitudinal direction L1 intersects in plan view with a direction L2 in which O1 (the center of the display area AA) and O2 (the center of the transfer electrode 37) are connected. Such a feature allows the alignment film material to be effectively regulated not to come from the display area AA to the transfer overlapping area TA overlapping with the transfer electrode 37. Moreover, the first grooves 81 are provided so that the clearances G of the first grooves 81 adjacent to one another between the columns are not arranged side by side. Even if the alignment film material travels over a clearance G of an inner peripheral first groove 81 of the first grooves 81 in three columns in parallel with one another, an outer peripheral first groove 81 next to the inner peripheral first groove 81 can regulate the wet-spreading of the alignment film material, enhancing the regulation. More specifically, as illustrated in FIG. 6, a pitch P1 of a first groove 81 in a single column and a pitch P2 of another first groove 81 in the adjacent column has a relationship of $P2=0.5 \times P1$. That is, the first grooves 81 adjacent to one another between the columns are arranged to shift by half a pitch from each other. Such a feature allows the clearances G in the adjacent columns not to be arranged side by side.

As can be seen, the liquid crystal panel 10 includes the display area AA and the non-display area NAA surrounding the display area AA. The liquid crystal panel 10 includes: the array substrate 30 in which a plurality of pixel electrodes 31 are arranged; and the counter substrate 20 facing the array substrate 30, wherein the non-display area NAA of the array substrate 30 is provided with the transfer electrode 37 for supplying a predetermined potential to the counter substrate 20, the counter substrate 20 includes: the light shielding film 23; the counter electrode 21 placed close to the array substrate 30 in relation to the light shielding film 23, and receiving the potential from the transfer electrode 37; and the alignment film 29 stacked on the counter electrode 21, the counter substrate 20 includes the first groove 81 provided between the display area AA and the transfer overlapping area TA overlapping with the transfer electrode 37, the first groove 81 penetrating the counter electrode 21 and at least a portion of the light shielding film 23, and the first groove 81 extends in the first longitudinal direction L1 in plan view, the first groove 81 including a plurality of first grooves 81 formed in broken line and arranged to have the predetermined clearances G in the first longitudinal direction L1.

Such a feature allows the first groove 81 of the counter substrate 20 to retain the alignment film material, so that spread of the alignment film material from the display area AA can be regulated not to reach the transfer overlapping area TA. Moreover, the first groove 81 penetrates the counter electrode 21 such that the counter electrode 21 is not stacked on the side wall of the first groove 81. Such a feature does not cause instability, in electrical resistance of the counter electrode 21, due to an angled side wall. Furthermore, the first grooves 81 are arranged in broken line to have the clearances G, and, through the clearances G, the counter electrode 21 is in connection to the inner face. Such a feature makes it possible to stably ensure conduction between the array substrate 30 and the counter substrate 20. Hence, while the spread of the alignment film material is regulated, the electrical resistance can be stabilized between the transfer electrode 37 of the array substrate 30 and the counter electrode 21 of the counter substrate 20.

First Modification

Figure 8:
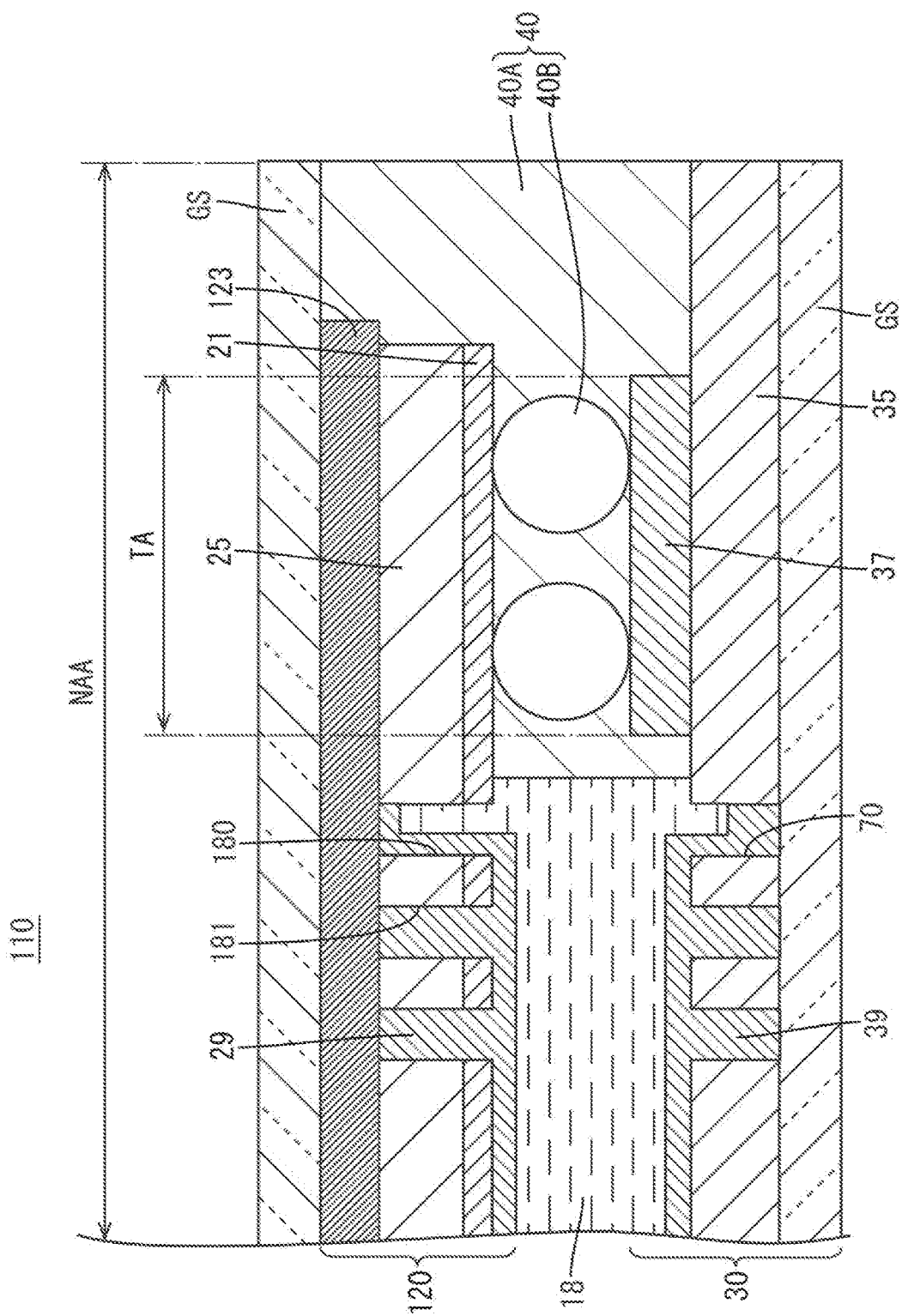
FIG. 8 is a cross-sectional view of the liquid crystal panel, according to a first modification, taken from line VII-VII of FIGS. 4 and 5.

A counter substrate 120 according to a first modification is described with reference to FIG. 8. The counter substrate 120 includes: an overcoat film 25 as another example of the first film; and a counter substrate groove 180 (a first groove 181 and a second groove 182). The overcoat film 25 is made of a light shielding film 123 and a resin material, and stacked on the glass substrate GS. The counter substrate groove 180 is provided to penetrate the counter electrode 21 and the overcoat film 25. In the first modification, as to configurations and advantageous effects similar to those in the first embodiment, redundant description shall be omitted.

The overcoat film 25 provided protects, and further planarizes, the color filter 22, making it possible to improve the optical property of the color filter 22. The overcoat film 25 has a thickness ranging from as thick as to 1.5 times as thick as the light shielding film 123, such that the counter substrate groove 180 can be easily formed deeper.

Second Embodiment

Figure 9:
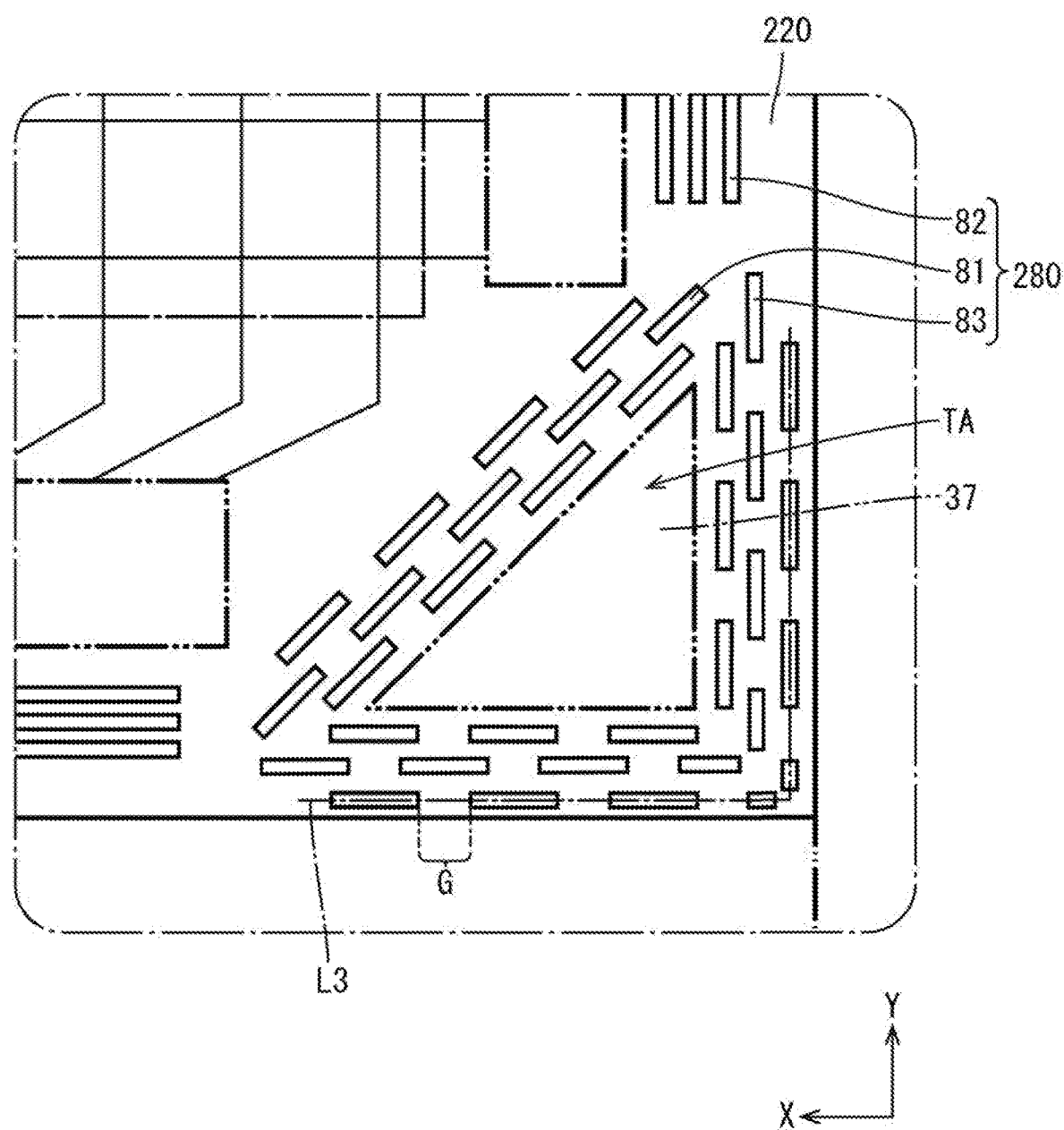
FIG. 9 is a plan view of a part including a first groove and a third groove of a counter substrate according to a second embodiment.

A counter substrate 220 according to a second embodiment is described with reference to FIG. 9. The counter substrate 220 includes a counter substrate groove 280 having a third groove 83 in addition to the first groove 81 and the second groove 82 in the first embodiment. In the second embodiment, as to configurations and advantageous effects similar to those in the first embodiment, redundant description shall be omitted.

The third groove 83 is provided between the transfer overlapping area TA and an outer periphery of the counter substrate 220. Specifically, as illustrated in FIG. 8, the third groove 83 is formed to extend in a third longitudinal direction L3 along the outer periphery of the counter substrate 220. More specifically, the third groove 83 is formed along the outer periphery of the counter substrate 220 including: a side in the Y-axis direction; and a side in the X-direction perpendicular to the side in the Y-axis direction. The third groove includes a plurality of third grooves formed in broken line and arranged to have the predetermined clearances G in the third longitudinal direction L3.

Described next are advantageous effects of the third groove 83. Depending on a position of the counter substrate 220 in a mother board before the counter substrate 220 is cut out into a predetermined shape from the mother substrate, the alignment film material might wet-spread from the outer periphery to the transfer overlapping area TA of the counter substrate 220 because of the manufacturing process (an application step in flexographic printing). Hence, the third groove 83 provided can regulate the wet-spreading of the alignment film material from the outer periphery of the counter substrate 220. Note that the first film according to the first modification may be applied to the second embodiment.

Other Embodiments

The present disclosure shall not be limited to the embodiments and the modification presented in the above descriptions and the drawings. Alternately, for example, embodiments below are also included in the technical scope of the present disclosure.

(1) In the above embodiments, as an example, the transfer electrodes are each provided to a corresponding one of right and left corners. Alternatively, a transfer electrode may be provided to either corner only. Moreover, the transfer electrodes do not have to be provided in corners. Alternatively, the transfer electrodes may be provided on a side of the non-display area. In such a case, the transfer electrodes do not have to be shaped triangularly unlike those described in the above embodiments as an example. The shape of the transfer electrodes can be changed appropriately, depending on, for example, a shape of the non-display area in which the transfer electrodes are provided.

(2) In the above embodiments, the array substrate grooves and the counter substrate grooves are arranged in column of three as an example. Alternatively, any number of the array substrate grooves and the counter substrate grooves may be arranged as long as one or more of the grooves are provided.

(3) In the above first modification, the counter substrate groove penetrates not the light shielding film but the overcoat film as an example. Alternatively, the counter substrate groove may penetrate both the light shielding film and the overcoat film.

(4) In the above embodiments, the color filter includes coloring portions for three colors. Alternatively, if the LCD device is not designed for color display, the color filter may include a monochromatic coloring portion for adjusting chromaticity of light from the backlight. Furthermore, the color filter may be omitted.

(5) The binary driver in the above embodiments is an example of a source driver. Alternatively, the binary driver may be a source driver outputting gray levels greater than a binary level as a source signal.

(6) In the above embodiments, the memory liquid crystal panel is described as an example. Alternatively, the present disclosure is also applicable to an active-matrix liquid crystal panel in which a counter substrate is provided with a counter electrode.

(7) In the above embodiments, the LCD device described as an example is semi-transmissive. Alternatively, the present disclosure may also be applicable to such LCD devices as reflective and transmissive ones.

REFERENCE SIGNS LIST

While there have been described what are at present considered to be certain embodiments of the invention, it will be understood that various modifications may be made thereto, and it is intended that the appended claim cover all such modifications as fall within the true spirit and scope of the invention.

What is claimed is:

1. A display panel including a display area and a non-display area surrounding the display area, the display panel comprising:
   an array substrate in which a plurality of pixel electrodes are arranged; and
   a counter substrate facing the array substrate, wherein
   the non-display area of the array substrate is provided with a transfer electrode for supplying a predetermined potential to the counter substrate,
   the counter substrate includes:
      a first film;
      a counter electrode is placed closer to the array substrate than the first film is, and supplied with the potential from the transfer electrode; and
      an alignment film stacked on the counter electrode,
   the counter substrate includes first grooves provided between the display area and a transfer overlapping area overlapping with the transfer electrode, the first grooves penetrating the counter electrode and at least a portion of the first film, and
   the first grooves extend in a first longitudinal direction in plan view, the first grooves being formed in broken line and arranged to have predetermined clearances in the first longitudinal direction,
   the counter electrode and at least the portion of the first film include second grooves provided between the transfer overlapping area and an outer periphery of the counter substrate, and
   the second grooves extend in a third longitudinal direction in plan view, the second grooves being formed in broken line and arranged to have the predetermined clearances in the third longitudinal direction.

2. The display panel according to claim 1, wherein the first film includes a light shielding film, and the first groove penetrates the light shielding film.

3. The display panel according to claim 1, wherein
the first film includes: a light shielding film; and an overcoat film having an insulating property and stacked on the light shielding film, and
the first groove penetrates at least the overcoat film.

4. The display panel according to claim 1, wherein
the first longitudinal direction intersects in plan view with a direction in which a center of the display area and a center of the transfer electrode are connected.

5. The display panel according to claim 1, wherein
the first grooves are aligned in columns provided in parallel with one another.

6. The display panel according to claim 5, wherein
the first grooves are provided so that the predetermined clearances of the first grooves adjacent to one another between the columns are not arranged side by side.

7. The display panel according to claim 5, wherein
the first grooves adjacent to one another between the columns are arranged to shift by half a pitch from each other.

8. The display panel according to claim 1, wherein
the counter electrode and at least the portion of the first film include a second third groove provided in an area in which the first groove is not provided, and surrounding the display area.

9. The display panel according to claim 1, wherein
the non-display area includes a seal configured to attach the array substrate and the counter substrate together, and
the transfer electrode is provided to overlap with the seal.

10. The display panel according to claim 9, wherein
the seal contains conductive particles.

11. The display panel according to claim 1, further comprising:
a liquid crystal layer sealed between the array substrate and the counter substrate.

12. The display panel according to claim 1, wherein
the pixel electrode is provided with a pixel interconnect to connect the pixel electrode and a memory circuit.

13. The display panel according to claim 1, wherein
the pixel electrode is optically reflective, and includes an opening through the pixel electrode along a film thickness.

14. A display device comprising:
the display panel according to claim 1; and
an illumination device configured to emit light to the display panel.

* * * * *